United States Patent
Xu

(10) Patent No.: US 9,706,058 B2
(45) Date of Patent: Jul. 11, 2017

(54) METHOD, SYSTEM AND NETWORK SIDE OF MONITORING MACHINE TYPE COMMUNICATION DEVICE EVENT

(71) Applicant: ZTE Corporation, Shenzhen, Guangdong (CN)

(72) Inventor: Hui Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 121 days.

(21) Appl. No.: 14/396,624

(22) PCT Filed: Aug. 21, 2013

(86) PCT No.: PCT/CN2013/081993
§ 371 (c)(1),
(2) Date: Oct. 23, 2014

(87) PCT Pub. No.: WO2014/059821
PCT Pub. Date: Apr. 24, 2014

(65) Prior Publication Data
US 2015/0103684 A1 Apr. 16, 2015

(30) Foreign Application Priority Data
Oct. 17, 2012 (CN) .......................... 2012 1 0395327

(51) Int. Cl.
H04W 4/00 (2009.01)
H04M 15/00 (2006.01)
(Continued)

(52) U.S. Cl.
CPC .............. H04M 15/66 (2013.01); H04B 7/26 (2013.01); H04B 17/101 (2015.01);
(Continued)

(58) Field of Classification Search
CPC ... H04B 17/00; H04B 17/003; H04B 17/0042
(Continued)

(56) References Cited

U.S. PATENT DOCUMENTS

2011/0270973 A1* 11/2011 Liao .................... H04L 41/0681
709/224
2011/0310868 A1* 12/2011 Yang .................... H04W 68/00
370/338
(Continued)

FOREIGN PATENT DOCUMENTS

CN 102238517 A 11/2011
CN 102724685 A 10/2012
(Continued)

OTHER PUBLICATIONS

Supplementary European Search Report in European application No. 13846779.0, mailed on Jul. 20, 2015.
(Continued)

*Primary Examiner* — Farah Faroul
(74) *Attorney, Agent, or Firm* — Oppedahl Patent Law Firm LLC

(57) ABSTRACT

The disclosure discloses a method of monitoring Machine-Type Communication device events, wherein a network side detects Machine-Type Communication (MTC) device events; when the occurrence or termination of a MTC device event is detected, sends an event report to a MTC server through a Policy and Charging Rules Function (PCRF), in which the MTC device event that has occurred or terminated is indicated. The disclosure further discloses, at the same time, a system and network of monitoring MTC device events. With the solution of the disclosure, it can be implemented that the network side reports a MTC device event to the MTC server and processes the MTC device according to the MTC device event that has occurred, as well as recovers
(Continued)

normal activities of the MTC device when the termination of the MTC device event that has occurred is detected.

23 Claims, 4 Drawing Sheets

(51) Int. Cl.
    *H04B 7/26* (2006.01)
    *H04B 17/10* (2015.01)
    *H04B 17/309* (2015.01)
    *H04W 48/00* (2009.01)

(52) U.S. Cl.
    CPC .......... *H04B 17/309* (2015.01); *H04W 4/005* (2013.01); *H04W 48/00* (2013.01)

(58) Field of Classification Search
    USPC ........................................................ 370/252
    See application file for complete search history.

(56) References Cited

U.S. PATENT DOCUMENTS

| | | | | |
|---|---|---|---|---|
| 2012/0250611 | A1* | 10/2012 | Yang | G01N 1/28 370/328 |
| 2012/0252481 | A1* | 10/2012 | Anpat | H04W 8/06 455/456.1 |
| 2012/0275348 | A1* | 11/2012 | Zhou | H04L 12/14 370/259 |
| 2012/0297064 | A1 | 11/2012 | Du | |
| 2013/0017829 | A1* | 1/2013 | Kim | H04W 60/06 455/435.1 |
| 2013/0039277 | A1* | 2/2013 | Li | H04W 4/005 370/328 |
| 2013/0078950 | A1* | 3/2013 | Liao | H04W 4/005 455/411 |
| 2013/0182644 | A1* | 7/2013 | Kim | H04W 76/025 370/328 |
| 2014/0092808 | A1* | 4/2014 | Jain | H04W 52/0258 370/328 |
| 2014/0134996 | A1* | 5/2014 | Barclay | H04W 24/08 455/422.1 |
| 2014/0274186 | A1* | 9/2014 | Cai | H04W 4/005 455/517 |
| 2016/0007138 | A1* | 1/2016 | Palanisamy | H04W 4/005 455/41.2 |

FOREIGN PATENT DOCUMENTS

| | | |
|---|---|---|
| EP | 2566201 A1 | 3/2013 |
| WO | 2011094935 A1 | 8/2011 |
| WO | 2011134336 A1 | 11/2011 |

OTHER PUBLICATIONS

System improvements for Machine-Type Communications (MTC) (Release 11), mailed on Sep. 18, 2012.
Detecting and Reporting by MD, mailed on Apr. 6, 2011.
International Search Report in international application No. PCT/CN2013/081993, mailed on Nov. 21, 2013.
English Translation of the Written Opinion of the International Search Authority in international application No. PCT/CN2013/081993, mailed on Nov. 21, 2013.

* cited by examiner

METHOD, SYSTEM AND NETWORK SIDE OF MONITORING MACHINE TYPE COMMUNICATION DEVICE EVENT

TECHNICAL FIELD

The disclosure relates to mobile communication technology, especially to a method, system and network side of monitoring Machine Type Communication (MTC) device events.

BACKGROUND

Machine to Machine (M2M) refers to all of the techniques and approaches to create connections between machines. The research of application scenarios of M2M communications shows that the supply of M2M communications to a mobile network has a potential market outlook. However, the M2M services put forward many new requirements to a system. In order to improve the competitiveness of mobile networks in this respect, it is necessary to optimize existing mobile networks so as to support the M2M communications more effectively.

Existing mobile networks are mainly designed for the Man to Man communications, without sufficient optimizations of Machine to Machine or Man to Machine communications. In addition, The key to success of the deployment of the M2M communication is how operating companies can provide M2M communication services at low cost.

Based on the above case, it is necessary to research how mobile networks support the M2M communications; the solution should use existing mobile networks as much as possible, such that the influence to the mobile networks by the M2M communications and the complexity of operation and maintenance could be reduced to the greatest extent.

In order to take use of resources of mobile networks effectively, the 3rd Generation Partnership Project (3GPP) proposes a Machine Type Communication (MTC), that is, communication services of Machine to Machine or Machine to Man, of which the scope of service exceeds the communication of Human to Human (H2H) far and away, which differs significantly from the current H2H communications in access control, charging, security, QoS (Quality of Service), service mode, etc.

The structure of a 3GPP Evolved Packet System (EPS) is as shown as in FIG. 1. The EPS includes a radio access network and a core network, wherein the EPS is such as E-UTRAN, UTRAN, GERAN, and the core network is, for example, an Evolved Packet Core (EPC) network which includes network elements such as Mobility Management Entity (MME), Serving Gateway (S-GW), and Packet Data Network (PDN) Gateway (P-GW), a GPRS core network which includes network elements such as a Serving GPRS Support Node (SGSN) and a Home Subscriber Server (HSS), an E-UTRAN which includes an evolved Node B (eNB), a service network which includes Policy and Charging Rules Function (PCRF) that is responsible for controlling the Policy and Charging Enhanced Function (PCEF) located in P-GW or Gateway GPRS Support Node (GGSN) to implement the detention, gating and QoS control of Service Data Flow (SDF). A Policy Control and Charging (PCC) subsystem located between a service control layer and a access/support layer is responsible for the resource admission control and the service policy control of the whole system. The system architecture of PCC is as shown in FIG. 2, the PCRF is connected to Subscription Profile Repository (SPR) via a Sp interface, to AF via a Rx interface, to OCS via a Sy interface, to BBERF via a Gxx interface, to TDF via a Sd interface, to PCEF in the gateway via a Gx interface, to OFCS via a Gz interface.

As MTC devices are arranged in areas with high-risk in general, the possibility of damage or theft of communication modules might be high. This requires that the network side is able to detect abnormal events relative to MTC devices and adopt corresponding processing measures, such as limiting the access of MTC devices to the network, which is called MTC monitoring.

The MTC monitoring includes a plurality of aspects: event and processing configuration, event detection, event report, wherein the event and processing configuration is for setting the events to be monitored and processing activities after the discovery of events, the event detention is for detecting pre-set events by the network side, and the event report is for sending the detected event information to a MTC server.

At present, there is no solution to solve the problems such as how the network side reports a detected MTC device event to a MTC server when the network has detected a MTC device event and how the network side deals with such a event when the user equipment (UE) where such a event occurs returns to normal.

SUMMARY

The embodiments of the disclosure mainly provides a method, system and network side of monitoring a MTC device event, the network side is able to report the detected MTC device event to a MTC server.

The technical solution in the embodiments of the disclosure is implemented as follows.

A method of monitoring a Machine Type Communication device event provided in the embodiments of the disclosure includes that:

a network side detects a MTC device event; when the occurrence or termination of a MTC device event is detected, the network side sends a MTC server through a PCRF an event report in which the MTC device event that has occurred or terminated is indicated.

In the solution described above, the network side detecting a MTC device event may include that: the network side detects whether each MTC device event matches with the current state of a UE, and determines that the MTC device event occurs when they match; or the network side detects whether the MTC device event that has occurred matches with the current state of the UE, and determines that the MTC device event terminates when they do not match.

In the solution described above, the network side is at least one of the following: a Mobile Management Entity (MME), a Service GPRS Support Node (SGSN), a Home Subscriber Server (HSS), a Home Location Register (HLR), a Gateway GPRS Support Node (GGSN), and a Packet data network Gateway (P-GW).

In the solution described above, the MTC device event may be set or stored in the HSS or HLR in advance, and includes any of the following: mismatch between UE activity and activated functions, change in association between the UE and a Universal Integrated Circuit Card, disconnection of the UE from a network, and change in position or attachment point of the UE.

In the solution described above, the detection may be performed periodically or according to the local policy of operators.

In the solution described above, the MTC server may include any of the following: a Service Capability Server (SCS), an Application Server (AS).

In the solution described above, sending the event report to the MTC server through PCRF may be that: the network side sends the MTC device event that has occurred to the PCRF, which sends the event report to the MTC server using MTC Inter-Working Function (MTC-IWF) or to the MTC server directly.

In the solution described above, the event report may include at least an event identification and a MTC device identification, wherein the event Identification is for indicating the MTC device event that has occurred or terminated.

In the solution described above, wherein the method may further include that: when the network side detects the occurrence of the MTC device event, the network side processes the MTC device according to the MTC device event that has occurred, the processing rule may include any of the following: reducing services to the UE, limiting the access to network of the UE, and detaching the UE.

In the solution described above, the method may further include: when the network side detects the termination of the MTC device event that has occurred, the network side releases the processing of the MTC device and the MTC server sends a response message to the network side through the PCRF.

A system of monitoring a MTC device event provided in the embodiments of the disclosure includes a network side, a PCRF, and a MTC server; wherein the network side is configured to detect a MTC device event, send the MTC server through the PCRF an event report in which the MTC device event that has occurred or terminated is indicated, when the occurrence or termination of the MTC device event is detected;

the MTC server is configured to receive the event report through the PCRF;

the PCRF is configured to support the information exchange between the network side and the MTC server.

In the solution described above, the network side is at least one of the types below: a MME, a SGSN, a HSS, a HLR, a GGSN, and a P-GW;

In the solution described above, the MTC server may include any of the following: a Service Capability Server, an Application Server In the solution described above, the MTC server may be also configured to send a event response message to the network side through the PCRF.

In the solution described above, the network side includes a detection module, an event report module; wherein the detection module is configured to detect a MTC device event, and send a MTC device event that has occurred or terminated to the event report module when the occurrence or termination of the MTC device event is detected;

the event report module is configured to send the MTC server through the PCRF the event report in which the occurrence or termination of the MTC device event is indicated.

In the solution described above, the detection module is configured to detect whether each MTC device event matches with the current state of a UE, and determines that the MTC device event occurs when they match; or to detect whether the MTC device event that has occurred matches with the current state of the UE, and determines that the MTC device event terminates when they do not match.

In the solution described above, the network side also may include a processing module configured to process the MTC device according to the MTC device event that has occurred.

In the solution described above, the detection module may be also configured to inform the processing module when the termination of the MTC device event that has occurred is not detected.

In the solution described above, the detection module may be also configured to stop the processing module from processing the MTC device when the termination of the MTC device event that has occurred is detected.

A network side provided in the embodiments of the disclosure includes a detection module, an event report module; wherein the detection module is configured to detect a MTC device event, and send a MTC device event that has occurred or terminated to the event report module when the occurrence or termination of the MTC device event is detected;

the event report module is configured to send an event report to the MTC server through the PCRF, in which the occurrence or termination of the MTC device event is indicated.

The disclosure discloses a method, system and network side of monitoring MTC device events, wherein the network side detects MTC device events; when the occurrence or termination of a MTC device event is detected, an event report is sent to a MTC server through PCRF, in which the MTC device event that has occurred or terminated is indicated; in this way, it may be implemented that the network side reports the MTC device event to the MTC server and processes the MTC device according to the MTC device event that has occurred, as well as recovers the normal activities of the MTC device when the network side detects the termination of the MTC device event that has occurred.

DETAILED DESCRIPTION

In the embodiments of the present disclosure, a network side detects a MTC device event, and sends a MTC server through PCRF an event report which indicates the MTC device event that has occurred or ended, when the occurrence or termination of the MTC device event is detected.

The present disclosure is to be described in more details with the appended figures and specific embodiments.

Figure 3:
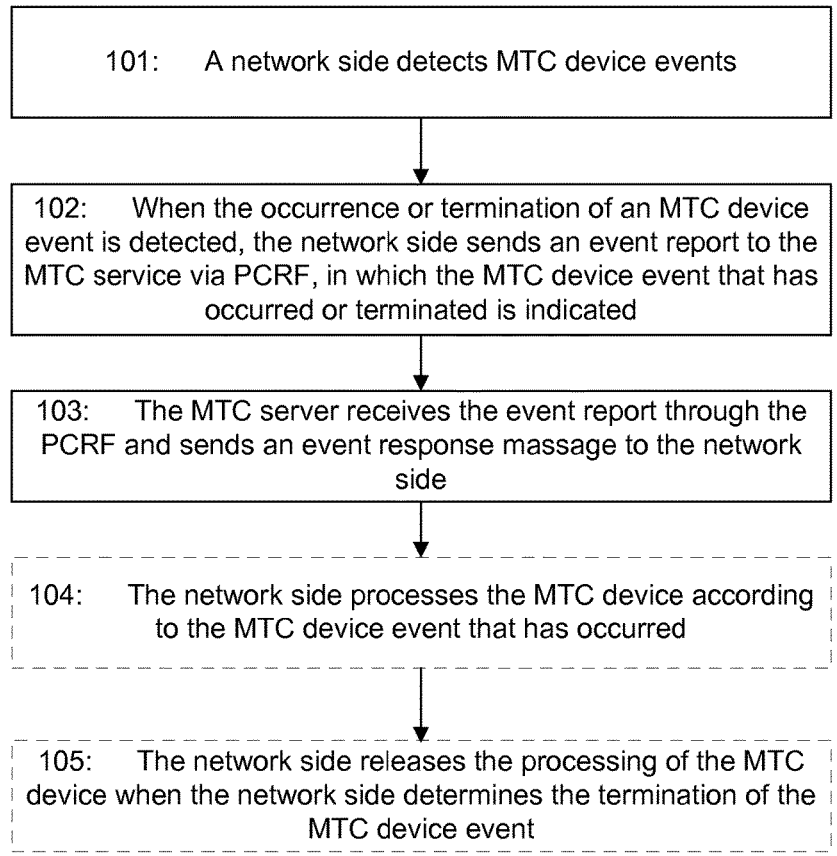
FIG. 3 is a schematic diagram of a flow chart of a method of monitoring MTC device events according to an embodiment of the present disclosure.

An embodiment of the present disclosure provides a method of monitoring MTC device events, as shown in FIG. 3, and the method includes the following steps.

Step 101, a network side detects MTC device events;

specifically, the network side detects whether each MTC device event matches with the current state of a UE, and determines that a MTC device event occurs when the MTC device event matches with current state of the UE; or the network side detects whether the MTC device event that has occurred matches with the current state of the UE, and determines that the MTC device event has terminated when they do not match with each other;

the network side is at least one of the types below: MME, SGSN, HSS, HLR, GGSN, P-GW;

the MTC device events are ones set or stored in HSS or HLR in advance, including any one of the following: the mismatch between a UE activity and an activated function, the change of association between the UE and a Universal Integrated Circuit Card (UICC), the disconnection of the UE from the network, the change of the position or attachment point of the UE, etc.; the maximum duration between the moment when the disconnection of the UE from the network happens and the moment when the disconnection of the UE from the network is detected by the network side is pre-set;

the detection may be performed periodically or according to the local policy of operating companies.

Figure 1:
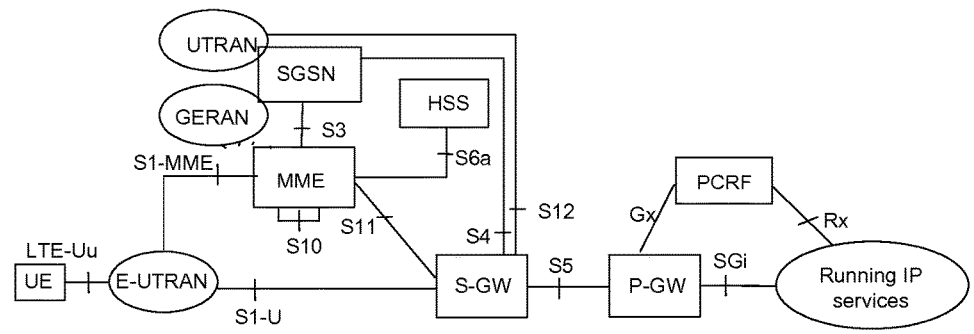
FIG. 1 is a schematic diagram of the architecture of a 3GPP evolved packet system in the art.
Figure 2:
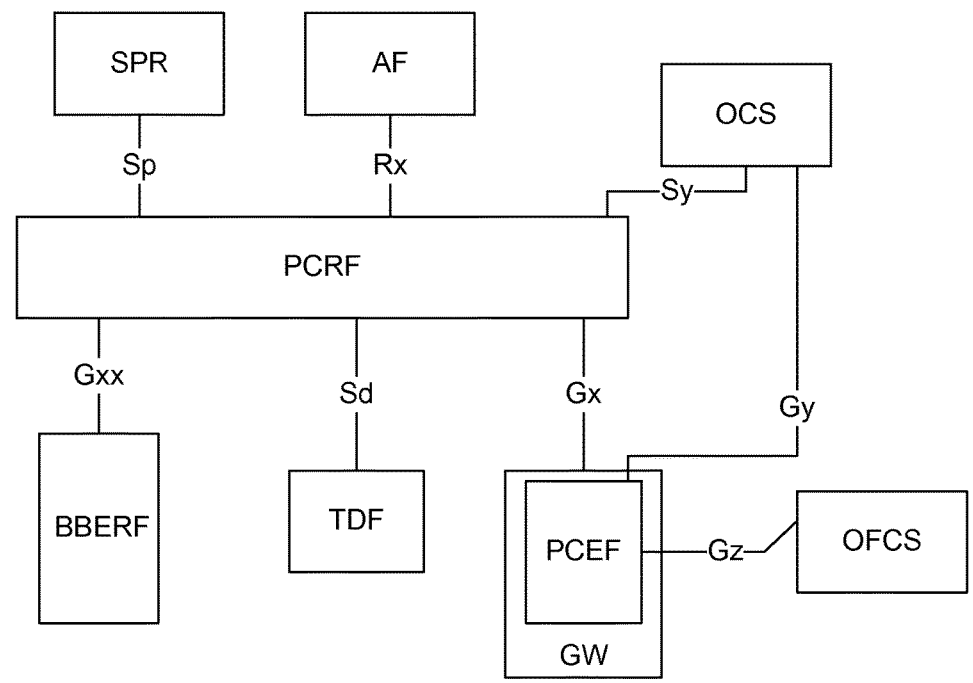
FIG. 2 is a schematic diagram of the system architecture of PCC in the art.

Step 102, the network side sends the MTC service via PCRF an event report which indicates the MTC device event that occurred or ended, when the occurrence or termination of the MTC device event is detected;

specifically, the network side sends the MTC device event that has occurred or terminated to the PCRF when the occurrence or termination of the MTC device event is detected; as shown in FIG. 1, the network side sends the MTC device event that has occurred or terminated to the PCRF via P-GW/GGSN; the PCRF sends a MTC server via a Rx interface an event report, in which the occurrence or termination of the MTC device event is indicated.

It should be indicated that, the PCRF sends the event report to the MTC server via MTC Inter-Working Function (MTC-IWF) if the RCRF is connected to the MTC server through the MTC-IWF; the PCRF sends the event report to the MTC server directly if the PCRF is connected to the MTC server directly.

The PCRF is a functional entity of a PCC system of a home network HPLMN.

The MTC server includes any one of the following: a Service Capability Server (SCS), an Application Server (AS).

It should be indicated that, if the PCRF is connected to the SCS through the MTC-IWF, the MTC server also includes the MTC-IWF.

The event report includes at least an event identification and a MTC device identification, wherein the event identification is for indicating the MTC device event that has occurred, for example, using the enumeration type or bit index to indicate the MTC device events set or stored in the HSS or HLR.

Step 103, the MTC server receives the event report through the PCRF and sends an event response massage to the network side;

the network side is the one that detects the occurrence or termination of the MTC device event.

The method described above may include:

Step 104, the network side processes the MTC device according to the MTC device event that has occurred;

the processing is to process according to the processing rules corresponding to the pre-set MTC device events, wherein the processing rules includes any one of the following: reducing services to the UE, limiting the visiting of UE to the network, detaching the UE, etc.

Said processing rules are stored in a HSS or HLR database, along with the MTC device events.

The processing and the sending of the event report can be performed simultaneously.

Further, it can also include Step 5 in which the network side releases the processing of the MTC device when the network side determines the termination of the MTC device event.

The release of the processing of the MTC device by the network side is for example to recover the normal activities of the MTC device.

Figure 4:
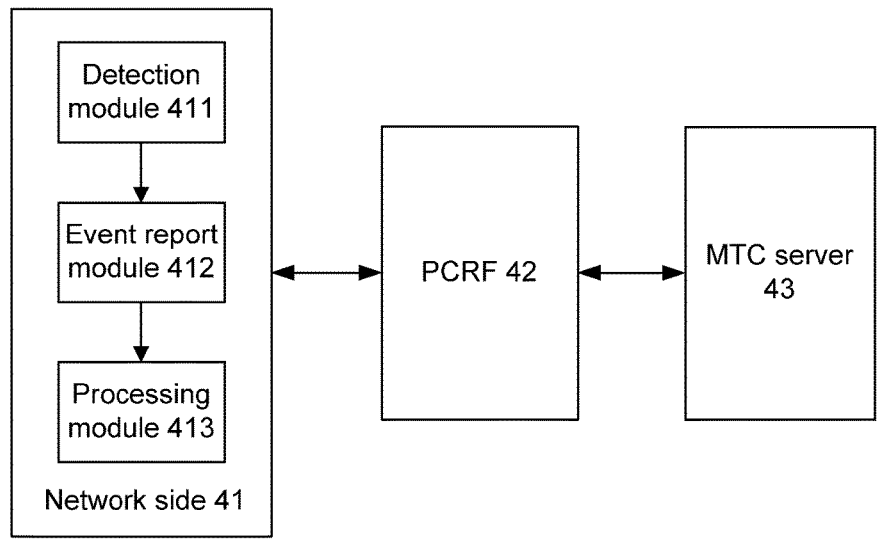
FIG. 4 is a schematic diagram of the structure of a system of monitoring MTC device events according to an embodiment of the present disclosure.

In order to implement the method described above, an embodiment of the present disclosure further provides a system of monitoring MTC device events, as shown in FIG. 4, including a network side 41, a PCRF 42, a MTC server 43.

The network side 41 is configured to detects MTC device events, sends the MTC server 43 through the PCRF 42 an event report in which the MTC device event that has occurred or terminated is indicated, when the occurrence or termination of the MTC device event is detected;

the MTC server 43 is configured to receive the device events through the PCRF 42;

the PCRF 42 is configured to support the information exchange between the network side 41 and the MTC server 43;

the network side 41 is at least one of the types below: MME, SGSN, HSS, HLR, GGSN, P-GW;

the MTC server 43 includes any one of the following: an SCS, an AS;

It should be indicated that, if the PCRF 42 is connected with the SCS through the MTC-IWF, the MTC server 43 also includes the MTC-IWF.

The event report includes at least an event identification and a MTC device identification, wherein the event identification is configured to indicate the MTC device event that has occurred, for example, using the enumeration type or bit index to indicate the MTC device events set or stored in the HSS or HLR;

the MTC server 43 is also configured to send event a response message to the network side 41 through the PCRF 42;

the network side 41 specifically includes a detecting module 411, an event report module 412; wherein, the detection module 411 is configured to detect MTC device events, and send a MTC device event that has occurred or terminated to the event report module 412 when the occurrence or termination of the MTC device event is detected;

the event report module 412 is configured to send the MTC server 43 through the PCRF 42 the event report in which the occurrence or termination of the MTC device event is indicated;

the detection module 411 is specifically configured to detect whether each MTC device event matches with the current state of a UE, and determines that a MTC device event occurs when the MTC device event matches with the current state of the UE; or to detect whether the MTC device event that has occurred matches with the current state of the UE, and determines that the MTC device event terminates when they not match with each other;

the MTC device events are ones set or stored in advance in the HSS or HLR, including any one of the following: the mismatch between a UE activity and an activated function, the change of association between the UE and a Universal Integrated Circuit Card (UICC), the disconnection of the UE from the network, the change of the position or attachment point of the UE, etc.; the maximum time duration between the moment when the disconnection of the UE from the network happens and the moment when the disconnection of the UE from the network is detected by the network side is pre-set;

the detection may be performed periodically or according to the local policy of operating companies.

The network side 41 also includes a processing module 413 configured to process the MTC device according to the MTC device event that has occurred;

the processing is to process according to the processing rules corresponding to the pre-set MTC device events, where the processing includes any one of the following: reducing services to the UE, limiting the access of UE to the network, detaching the UE, etc.;

said processing rules are stored in the HSS or HLR database, along with the MTC device events;

the processing and the sending of the event report can be performed simultaneously;

the detection module 411 is also configured to inform the processing module 413 when the termination of the MTC device event that has occurred is not detected;

the detection module 411 is also configured to stop the processing module from processing the MTC device when the termination of the MTC device event that has occurred is detected.

Based on the system described above, an embodiment of the present disclosure also provides a network side 41, as shown in FIG. 4, including a detection module 411, and an event report module 412; wherein, the detection module 411 is configured to detect MTC device events, and send a MTC device event that has occurred or terminated to the event report module 412 when the occurrence or termination of the MTC device event is detected;

the event report module 412 is configured to send the MTC server 43 through the PCRF 42 the event report in which the occurrence or termination of the MTC device event is indicated;

the detection module 411 is specifically configured to detect whether each MTC device event matches with the current state of a UE, and determines that a MTC device event occurs when the MTC device event matches with the current state of the UE; or to detect whether the MTC device event that has occurred matches with the current state of the UE, and determines that the MTC device event terminates when they do not match;

the MTC device events are ones set or stored in HSS or HLR in advance, including any one of the following: the mismatch between a UE activity and an activated function, the change of association between the UE and a Universal Integrated Circuit Card (UICC), the disconnection of the UE from the network, the change of the position or attachment point of the UE, etc.; the maximum duration between the moment when the disconnection of the UE from the network occurs and the moment when the disconnection of the UE from the network is detected by the network side is pre-set;

the detection may be performed periodically or according to the local policy of operators.

The network side 41 also includes a processing module 413 configured to process the MTC device according to the MTC device event that has occurred;

the processing is to process according to the processing rules corresponding to the pre-set MTC device events, where the processing includes any one of the following: reducing services to the UE, limiting the access of the UE to the network, detaching the UE, and etc.;

said processing rules are stored in the HSS or HLR database, along with the MTC device events;

The processing and the sending of the event report can be performed simultaneously;

the detection module 411 is also configured to inform the processing module 413 when the termination of the MTC device event that has occurred is not detected;

the detection module 411 is also configured to stop the processing module from processing the MTC device when the termination of the MTC device event that has occurred is detected.

The implementation procedure and the principle of the method in an embodiment of the present disclosure is described in more details in combination with specific embodiments.

Embodiment 1

Figure 5:
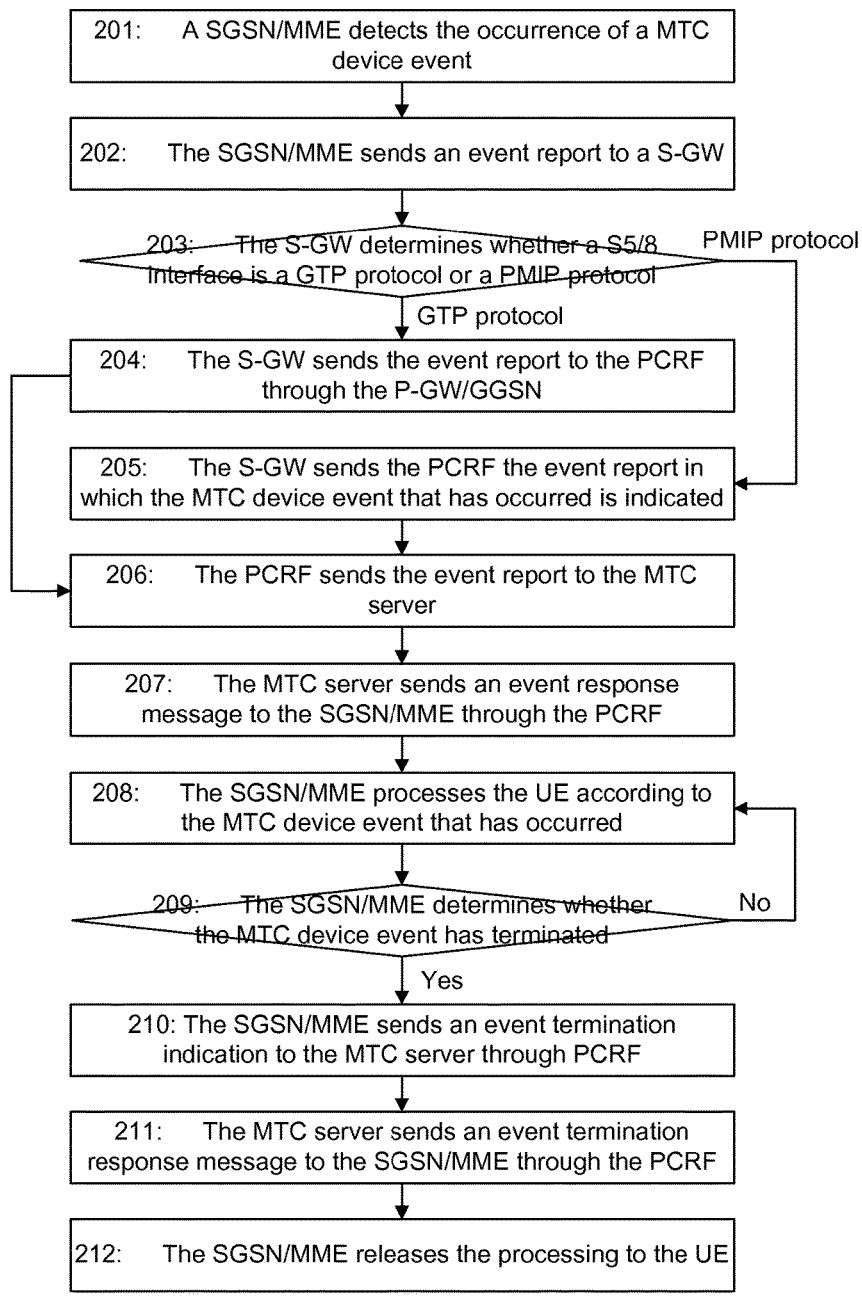
FIG. 5 is a schematic diagram of a flow chart of a method of monitoring MTC device events according to embodiment 1 of the present disclosure.

In the embodiment, it is the SGSN or MME which detects MTC device events at the network side, so as to implement the method of monitoring MTC device events, as shown in FIG. 5, the method includes following steps.

Step 201, A SGSN/MME detects the occurrence of a MTC device event;

the SGSN/MME has obtained MTC devices events and the corresponding processing rules from a HSS/HLR prior to this step;

in this step, the SGSN/MME may detect a MTC device event periodically or according to the local policy of operators;

in this step, the SGSN/MME detects the occurrence of the MTC device event in a predetermined time.

Step 202, The SGSN/MME sends an event report to a S-GW;

the event report includes at least an event identification and a MTC device identification.

Step 203, The S-GW determines whether a S5/8 interface is a GPRS Tunnel Protocol (GTP protocol) or a Proxy Mobile IP (PMIP) protocol, then step 204 is executed if former and step 205 is executed if latter;

the S5/8 interface is the one between the S-GW and a P-GW; it is a S5 interface when both of S-GW and P-GW belong to a home network hPLMN and it is a S8 interface when the S-GW is located in a visited network vPLMN and the P-GW is located in the home network hPLMN;

the S5/8 interface may use the GTP or PMIP protocol; the S-GW sends the event report through the P-GW when the GTP protocol is used; and when the PMIP protocol is used, an interface exists between the S-GW and the PCRF, and the S-GW sends the event report to PCRF directly.

Step 204, the S-GW sends the event report to PCRF through the P-GW/GGSN;

the S-GW sends the event report to the P-GW/GGSN using a GTP-C message, the P-GW/GGSN sends the PCRF the event report in which the MTC device event that has occurred is indicated;

the event report may be sent after an addition of the current interface message to the event information.

Step 205, the S-GW sends the PCRF event report in which the MTC device event that has occurred is indicated.

Step 206, the PCRF sends the event report to the MTC server;

the MTC server may be an SCS or an AS.

Step 207, the MTC server sends an event response message to SGSN/MME through PCRF;

the MTC server sends the event response message to the PCRF, indicating the reception of said event report;

the PCRF forwards the event response message to the P-GW/GGSN or the S-GW; as shown in step 203, when the S5/8 interface uses the GTP, the PCRF sends the event response message to the S-GW through the P-SW/GGSN and then the S-GW forwards the response message to the SGSN/MME; when the S5/8 uses the PMIP, the PCRF sends the event response message to the S-GW and the S-GW forwards the response message to the SGSN/MME.

Step 208, the SGSN/MME processes the UE according to the MTC device event that has occurred;

the SGSN/MME obtains processing rules corresponding to the pre-set MTC device events from the HSS/HLR and processes the UE according to the MTC device event that has occurred.

The processing includes at least any one of the following: the SGSN/MME instructing the S-GW to reduce services sent to the UE, the SGSN/MME instructing the radio access network (RAN) to limit cells to which the UE is switched, the SGSN/MME rejecting the RAU/TAU request initiated by the UE, and the SGSN/MME instructing the UE to be detached.

Step 209, the SGSN/MME determines whether the MTC device event has terminated, and step 210 is then executed when it has terminated, otherwise, step 208 is then executed;

specifically, the SGSN/MME detects whether the MTC device event that has occurred matches with the current state of the UE after it processes the UE, determines that the MTC device event has terminated in the case of mismatch and step 210 is then executed, or determines that the MTC device event has not terminated in the case of match and step 208 is then executed; it should be indicated that, the MTC device event here is the one detected in step 201, a new MTC device event should be reported and processed according to the steps above.

Step 210, the SGSN/MME sends an event termination indication to the MTC server through PCRF;

as described in step 203, according to the S5/8 interface protocol, the SGSN/MME sends the event termination indication message to the PCRF, which includes at least an event identification and a MTC device identification.

Step 211, the MTC server sends an event termination response message to the SGSN/MME through the PCRF.

Step 212, the SGSN/MME releases the processing to the UE;

this step is that the SGSN/MME instructs the S-GW to recover the services sent to the UE, or the SGSN/MME instructs the RAN to cancel the limitation the cells to which the UE is switched, or the SGSN/MME receives the RAU/TAU request initiated by the UE.

Embodiment 2

Figure 6:
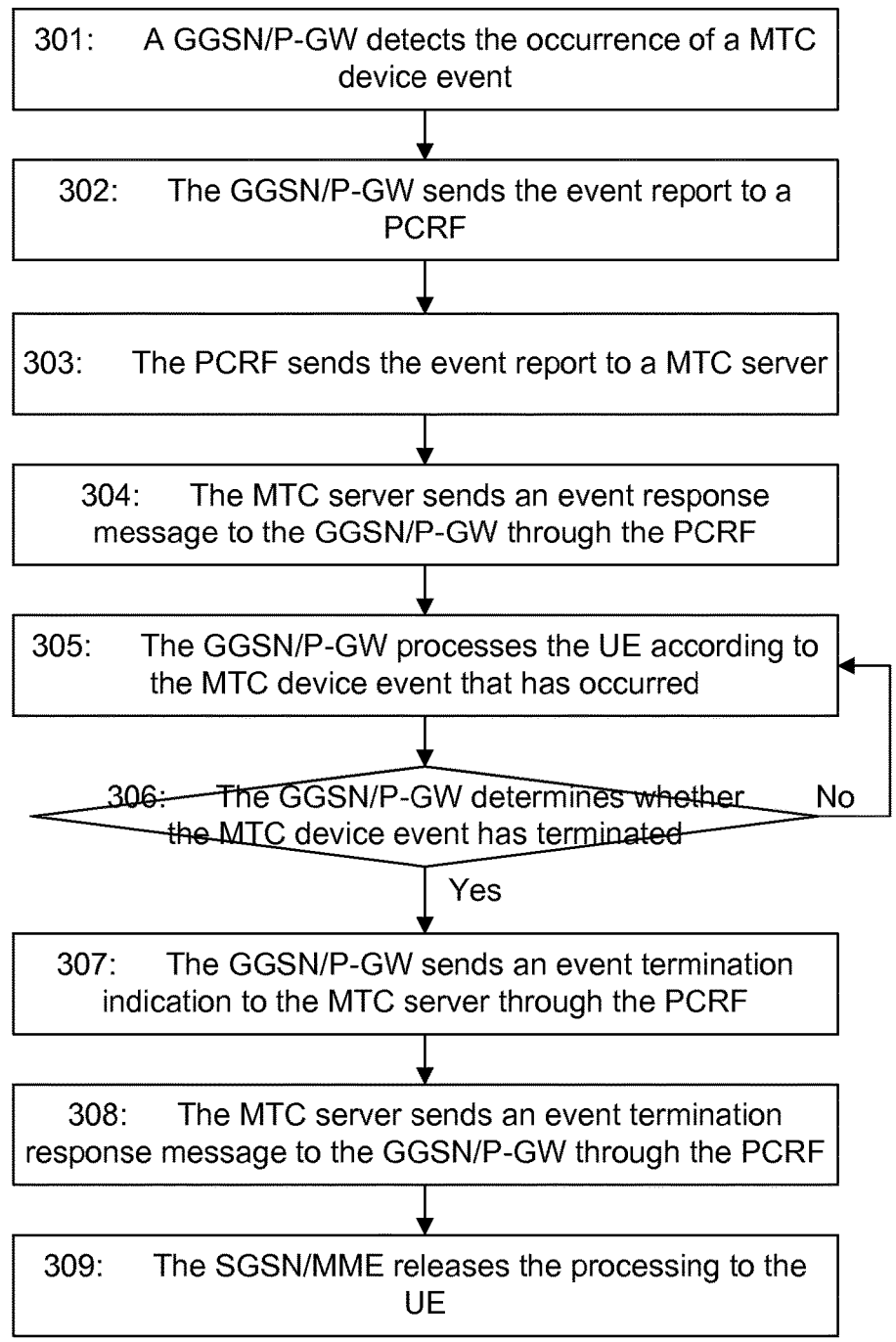
FIG. 6 is a schematic view of flow chart of the method of monitoring MTC device events according to embodiment 2 of the present disclosure.

In the embodiment, it is the GGSN/P-GW which detects MTC device events at the network side, so as to implement the method of monitoring MTC device events, as shown in FIG. 6, the method includes following steps.

Step 301, the GGSN/P-GW detects the occurrence of a MTC device event;

the GGSN/P-GW obtains the monitored events and rules information from the HSS/HLR prior to this step; there is no interface between the GGSN/P-GW and HSS/HLR here, the above information is needed to be obtained with the aid of other network nodes such as the SGSN/MME;

in this step, the GGSN/P-GW detects the MTC device events periodically or according to the local policy of operators, the GGSN/P-GW herein detects the MTC devices events with the aid of other network nodes so as to implement monitoring of the target MTC device, for example, detecting the MTC device events according to the attachment information of the UE, binding information of the IMSI and the IMEI, the detachment information of the UE provided by the SGSN/MME.

in this step, the GGSN/P-GW detects the occurrence of the MTC device event in a predefined time.

Step 302, the GGSN/P-GW sends the event report to PCRF;

the GGSN/P-GW sends the event report to the PCRF via a Gx interface.

Step 303, the PCRF sends the event report to the MTC server;

the PCRF sends the event report to the MTC server via a Rx interface.

Step 304, the MTC server sends an event response message to the GGSN/P-GW through PCRF;

the MTC server indicates the reception of the event report by sending the event response message.

Step 305, the GGSN/P-GW processes the UE according to the MTC device event that has occurred;

this step is identical to step 208, thus there is no need to repeat here.

Step 306, the GGSN/P-GW determines whether the MTC device event has terminated, and step 307 is executed when it has terminated, otherwise, step 305 is executed;

specifically, the GGSN/P-GW detects whether the MTC device event that has occurred matches with the current state of the UE after the GGSN/P-GW processes the UE, determines that the MTC device event has terminated in the case of mismatch and step 307 is then executed, or determines that the MTC device event has not terminated in the case of match and step 305 is then executed; it should be indicated that, the MTC device event here is the one detected in step 301, a new MTC device event should be reported and processed according to the steps above.

Step 307, the GGSN/P-GW sends an event termination indication to the MTC server through the PCRF.

Step 308, the MTC server sends an event termination response message to the GGSN/P-GW through the PCRF;

the MTC server indicates the reception of the event termination report by sending the event termination response message.

Step 309, the SGSN/MME releases the processing to the UE;

this step is identical to step 212.

INDUSTRIAL APPLICATION

In conclusion, the network side in the present disclosure detects MTC device events; when the occurrence or termination of a MTC device event is detected, an event report is sent to a MTC server through the PCRF, in which the MTC device event that has occurred or terminated is indicated; in this way, it may be implemented that the network side reports the MTC device event to the MTC server and processes the MTC device according to the MTC device event that has occurred, as well as recovers the normal activities of the MTC device when the network side detects the termination of the MTC device event that has occurred.

What is described above are merely the embodiments of the disclosure, but not to limit the scope of the disclosure.

What is claimed is:

1. A method of monitoring a Machine Type Communication device event, comprising:

detecting a Machine-Type Communication (MTC) device event by a core network side;

when occurrence or termination of the MTC device event is detected, sending, by the core network side, to a MTC server through a Policy and Charging Rules Function (PCRF) an event report in which the MTC device event that has occurred or terminated is indicated;

wherein the MTC device event is an event set or stored in advance in a Home Subscriber Server (HSS) or a Home Location Register (HLR), and comprises any one of the following: mismatch between user equipment (UE) activity and an activated function, change in association between a UE and a Universal Integrated Circuit Card (UICC), disconnection of the UE from a network, change in a position or attachment point of the UE.

2. The method according to claim 1, wherein detecting the MTC device event by the core network side comprises:

detecting, by the core network side, whether each MTC device event matches with a current state of the UE, determining that the MTC device event occurs when the MTC device event matches with the current state of the UE; or detecting, by the core network side, whether the MTC device event that has occurred matches with the current state of the UE, and determining that the MTC device event terminates when the MTC device event that has occurred does not match with the current state of the UE.

3. The method according to claim 1, wherein the core network side is at least one of the following: a Mobile Management Entity (MME), a Service GPRS Support Node (SGSN), an HSS, an HLR, a Gateway GPRS Support Node (GGSN), a Packet data network Gateway (P-GW).

4. The method according to claim 1, wherein the detection is performed periodically or according to a local policy of an operating company.

5. The method according to claim 1, wherein the MTC server comprises any one of the following: a Service Capability Server (SCS), an Application Server (AS).

6. The method according to claim 1, wherein sending the event report to the MTC server through the PCRF is:

sending, by the core network side, the MTC device event that has occurred to the PCRF;

sending, by the PCRF, the event report to the MTC server using a MTC Inter-Working Function (MTC-IWF) or to the MTC server directly.

7. The method according to claim 1, wherein the event report comprises at least an event identification and a MTC device identification, wherein the event identification is for indicating the MTC device event that has occurred or terminated.

8. The method according to claim 1, further comprising: when the core network side detects the occurrence of the MTC device event, the core network side processes a MTC device according to the MTC device event that has occurred, and a processing rule comprises any one of the following: reducing services to the UE, limiting access of the UE to a network, detaching the UE.

9. The method according to claim 1, further comprising: when the core network side detects the termination of the MTC device event that has occurred, releasing processing of a MTC device by the core network side.

10. A system of monitoring a Machine Type Communication device event, comprising a core network side, a Policy and Charging Rules Function (PCRF), a MTC server; wherein the core network side is configured to detect a MTC device event, and send to the MTC server through the PCRF an event report in which the MTC device event that has occurred or terminated is indicated, when occurrence or termination of the MTC device event is detected;

the MTC server is configured to receive the event report through the PCRF; and the PCRF is configured to support information exchange between the core network side and the MTC server;

wherein the MTC device event is an event set or stored in advance in a Home Subscriber Server (HSS) or a Home Location Register (HLR), and comprises any one of the following: mismatch between user equipment (UE) activity and an activated function, change in association between a UE and a Universal Integrated Circuit Card (UICC), disconnection of the UE from a network, change in a position or attachment point of the UE.

11. The system according to claim 10, wherein the core network side is at least one of the following: a Mobile Management Entity (MME), a Service GPRS Support Node (SGSN), an HSS, an HLR, a Gateway GPRS Support Node (GGSN), a Packet data network Gateway (P-GW).

12. The system according to claim 10, wherein the MTC server comprises any one of the following: a Service Capability Server, an Application Server.

13. The system according to claim 10, wherein the MTC server is further configured to send an event response message to the core network side through the PCRF.

14. The system according to claim 10, wherein the core network side is configured to detect the MTC device event, and send the MTC device event that has occurred or terminated when the occurrence or termination of the MTC device event is detected;

to send the MTC server through the PCRF the event report in which the occurrence or termination of the MTC device event is indicated.

15. The system according to claim 14, wherein the core network side is configured to detect whether each MTC device event matches with a current state of the UE, and determine that the MTC device event occurs when the MTC device event matches with the current state of the UE; or to detect whether the MTC device event that has occurred matches with the current state of the UE, and determine that the MTC device event terminates when the MTC device event does not match with the current state of the UE.

16. The system according to claim 14, wherein the core network side further is configured to process a MTC device according to the MTC device event that has occurred.

17. The system according to claim 16, wherein the core network side is further configured to process a MTC device according to the MTC device event that has occurred, and a processing rule comprises any one of the following: reducing services to the UE, limiting access of the UE to a network, detaching the UE, when the termination of the MTC device event that has occurred is not detected.

18. The system according to claim 17, wherein the core network side is further configured to release processing the MTC device when the termination of the MTC device event that has occurred is detected.

19. A core network side comprising a processor configured to execute programmed instructions comprising:

detecting a Machine-Type Communication (MTC) device event, and when occurrence or termination of the MTC device event is detected, sending to a MTC server through a Policy and Charging Rules Function (PCRF) an event report in which the occurrence or termination of the MTC device event is indicated;

wherein the MTC device event is an event set or stored in advance in a Home Subscriber Server (HSS) or a Home Location Register (HLR), and comprises any one of the following: mismatch between user equipment (UE) activity and an activated function, change in association between a UE and a Universal Integrated Circuit Card (UICC), disconnection of the UE from a network, change in a position or attachment point of the UE.

20. The core network side according to claim 19, the processor configured to execute programmed instructions comprising:

detecting whether each MTC device event matches with a current state of the UE, and determining that the MTC device event occurs when the MTC device event that has occurred matches with the current state of the UE; or detecting whether the MTC device event that has occurred matches with the current state of the UE, and determining that the MTC device event terminates when the MTC device event that has occurred does not match with the current state of the UE.

21. The core network side according to claim 19, the processor configured to execute programmed instructions comprising: processing a MTC device according to the MTC device event that has occurred.

22. The core network side according to claim 21, the processor configured to execute programmed instructions comprising:

when the termination of the MTC device event that has occurred is not detected, processing a MTC device according to the MTC device event that has occurred, and a processing rule comprises any one of the following: reducing services to the UE, limiting access of the UE to a network, detaching the UE.

23. The core network side according to claim 22, the processor configured to execute programmed instructions comprising:

releasing processing a MTC device when the termination of the MTC device event that has occurred is detected.

\* \* \* \* \*